April 4, 1967 T. BERSANO 3,311,993
APPARATUS FOR THE CONTINUOUS AIR-COOLING, OR HEATING, OF
GRANULATED MATERIALS
Filed Jan. 7, 1965 2 Sheets-Sheet 1
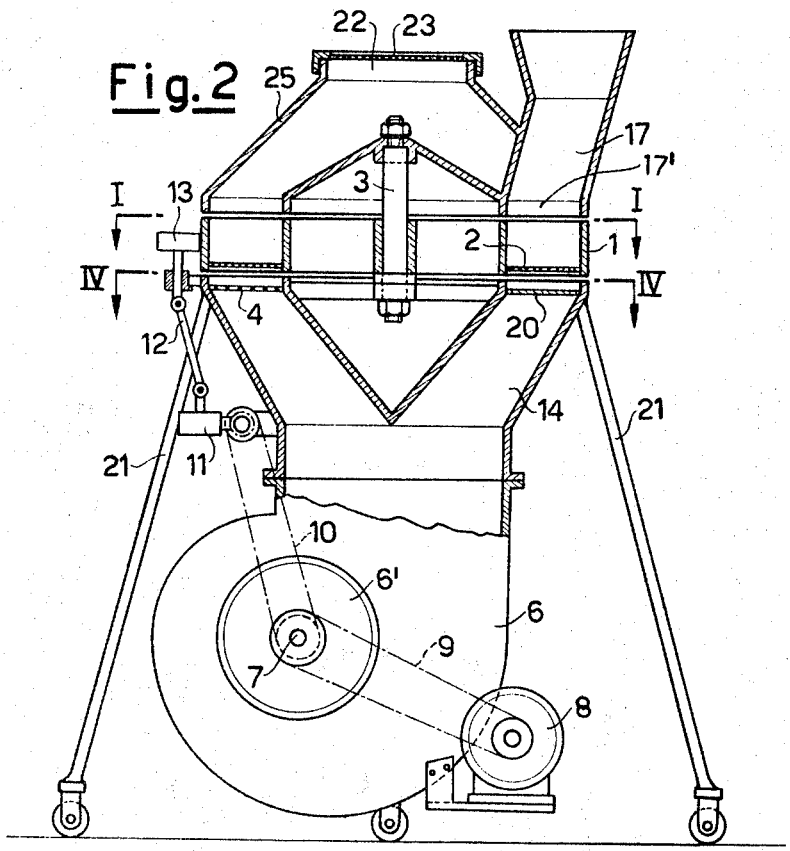
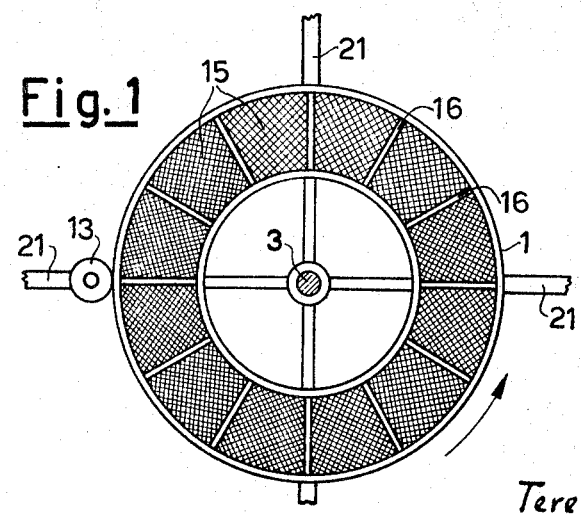
INVENTOR.
Terenzio Bersano
BY
/B.E.Shlesinger
Attorney

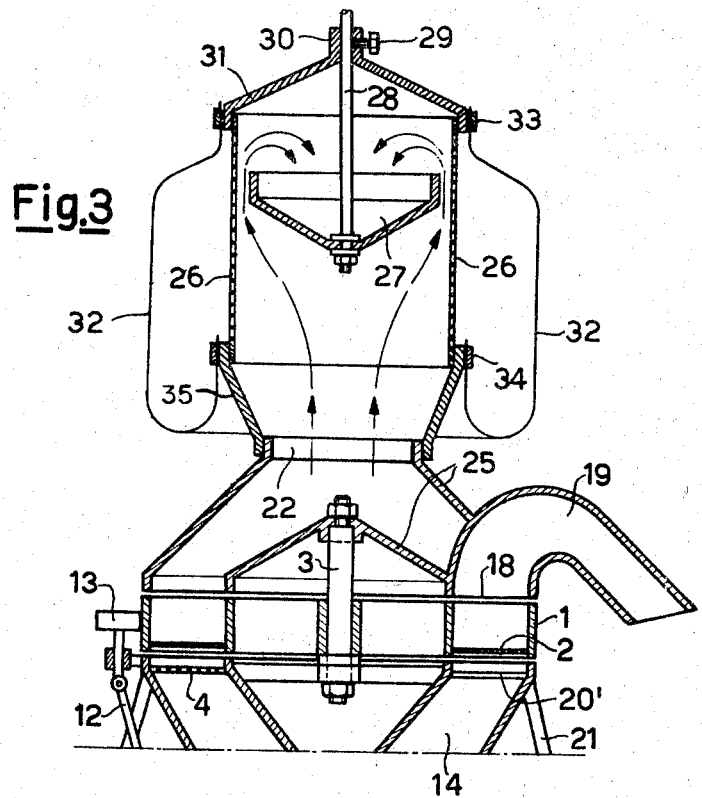
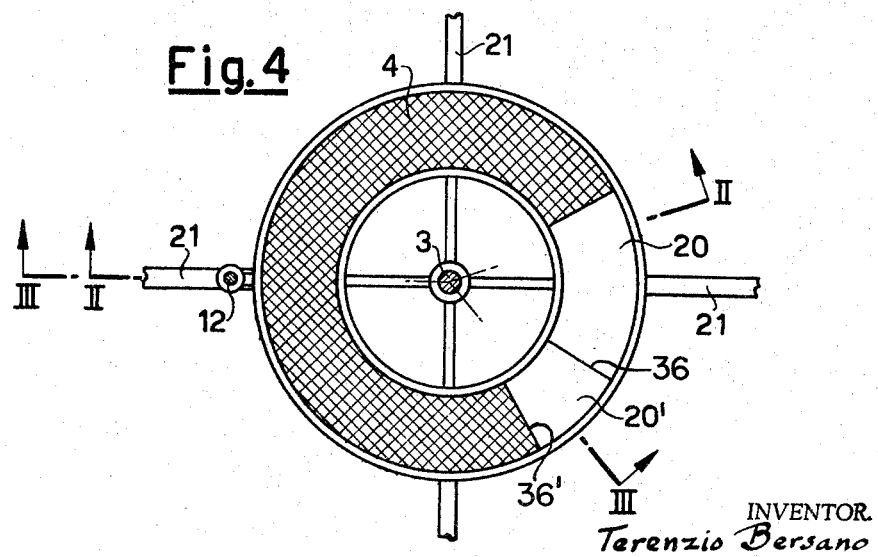

United States Patent Office 3,311,993
Patented Apr. 4, 1967

3,311,993
APPARATUS FOR THE CONTINUOUS AIR-COOLING, OR HEATING, OF GRANULATED MATERIALS
Terenzio Bersano, Via San Vito 9, Casciago,
Varese, Italy
Filed Jan. 7, 1965, Ser. No. 424,006
Claims priority, application Italy, Jan. 25, 1964,
1,684/64
4 Claims. (Cl. 34—57)

This invention relates to an apparatus for the continuous air-cooling, or heating, of granulated materials.

Several kinds of apparatus have been proposed by the prior art for effecting the cooling of granulated materials, such as e.g. granulated plastic materials, in order that they may be brought from the high temperatures obtaining in the neighborhood of the extruder to room temperature to enable their subsequent packing and shipment. These prior-art devices, however, suffer from several drawbacks which are mainly due to the low heat-exchange efficiency between the granules and the surrounding air, to bulkiness and intricacy of their mechanism.

Thus, for example, one prior-art device conveys the granules by means of a blower into a large conduit and thence to cyclone-separators. It is apparent that, in a device of this kind, the heat-exchange efficiency between the granulated material and the surrounding air is extremely low or even nonexistent, since both the airstream and the granules travel in the same direction, virtually without relative speed with respect to one another. So low is efficiency of these devices that, for rates of flow as high as 330 pounds an hour, two or three such devices should be employed, serially arranged with respect to one another. Other drawbacks are bulkiness, cleaning difficulties, high first costs and maintenance costs.

Other kinds of devices are based on the idea of having the granules climbing, by means of specially provided vibratory appliances, over an internally water-cooled metal wall. An intrinsic shortcoming of such an apparatus is that the relative speed of air to the granules is virtually nil and the cooling effect of the water is poorest since the contact between the granules and the cooled surface is but an occasional one and heat-exchange is virtually absent. Other shortcomings are the high cost and the tendency of the mechanical parts to be put out of commission owing to vibrational fatigue stresses.

Other devices, such as those with conveying screws and water jacket, are affected, besides the deficiency of heat exchange, also by the defect that the granules are very likely to "jam" between the fixed and the movable parts of the apparatus, with the attendant danger of jam-ups and stoppages of the machine.

An object of the present invention is to provide an apparatus for cooling (or heating), in a continuous operation, a granular material, more particularly but not exclusively, a granulated plastic material, such an apparatus being free from the above indicated shortcomings.

Another object of the present invention is to provide an apparatus, of the kind indicated above, in which the heat-exchange between air and the granulated material is materially improved.

A further object of the present invention is to provide a relatively non-bulky and inexpensive apparatus for cooling or heating granulated materials.

Other objects, features and advantages of the present invention will become apparent to all those who are skilled in the art as the present disclosure proceeds.

In order that the above indicated objects may be achieved, the apparatus according to this invention consists of a conveying trough open at the top, formed with a foraminous bottom plate, two sidewalls which are displaced along with the bottom plate and by a plurality of partition walls, these being also displaceable together with the sidewalls and arranged perpendicularly with respect to said sidewalls and said bottom plate. These partition walls divide the trough into a plurality of equally spaced apart compartments or cells. Means are further provided for continuously displacing, in a closed loop and at an adjustable speed, said trough along the direction of its own longitudinal axis, to convey the granules which sequentially drop into the trough from a fixed loading port to a discharge port, also fixed, spaced from the former. Means are also provided for blowing cold (or warm) air through the foraminous bottom plate of the trough in an upward direction, i.e. in a direction which is substantially at right angles to the direction of travel of the trough. To do so, the air feed will be such that the rate of flow and the pressure of the air is enough to retain the granules within the individual compartments and in a continuous shaking motion throughout the whole travel of the granules from the loading port to the discharge port, the amplitude of the shaking motion being proportional to the load and, in any case, never higher than the height of the trough.

According to a preferred embodiment of this invention, the apparatus in point is formed with a conveying canal or trough of annular configuration, rotatably mounted about a central vertical shaft and partitioned into a plurality of open-top cells by means of radially oriented and equi-angularly spaced partition walls affixed to the trough walls. A frustoconical conduit, of annular cross-sectional shape, is provided for feeding air coming from a blower just beneath the foraminous bottom plate of the trough. The air is blown through this conduit via an annular, foraminous and fixed distributing disk, said distributing disk having a sectoral area which is either partially or totally closed in the neighborhood of the loading port in order that the feeding of granules may not be disturbed. A completely open sectoral area is provided in the immediate neighborhood of the discharge port for the cooled granules for sending them to the outlet piping, the loading and discharge conduits being fastened to a fixed frustoconical lid. Said frustoconical lid conveys the air, which has blown through the trough, toward the outlet port formed in the lid. Means are provided to impart to the trough a rotational movement of adjustable speed, as well as means for setting the rate of flow and the pressure of the air fed on by the blower.

For the cooling (or heating) of the granules of plastic materials twin-intake, gear controlled, and speed variator fitted radial fans are preferable, since they have a characteristic of large rate of flow matched to a low pressure "head."

The adoption of a continuous trough which moves integrally as a unit (bottom plate, sidewalls and partition walls) for conveying the granules which should be subjected to the action of the air has proved, in practice, to be of vital importance. As a matter of fact any danger of the granules becoming jammed is done away with. This drawback would certainly occur if the trough had both movable and fixed component parts: moreover, the presence of the partition walls ensures constant conveyance by overcoming the piling-up of the granules which, although continually airborne, would go forward only occasionally and irregularly, should the partition walls be absent.

A preferred embodiment of this invention is illustrated, by way of example only, in the accompanying drawings, wherein:

FIGURE 1 is a cross-sectional view taken along the line I—I of FIGURE 2.

FIGURE 2 is a vertical cross-sectional view taken along line II—II of FIGURE 4.

FIGURE 3 is a partial cross-sectional view taken along the line III—III of FIGURE 4, and FIGURE 4 is a cross-sectional view, taken along the line IV—IV of FIGURE 2.

The apparatus shown in the drawings comprises a trough or annular basket 1, of rectangular cross-sectional shape, open at its top and having solid sidewalls and a foraminous bottom plate 2, partitioned into a plurality of open top cells 15 by means of partition walls 16: these latter are solidly affixed to the sidewalls. Said trough or basket is mounted for rotation about its own vertical central shaft 3, the latter being borne by a frame 21 mounted on castors for convenience of displacement of the whole unit. The same frame carries, in its lower portion, a radial fan 6, whose vanes 6' are keyed to a shaft 7. The latter takes its drive from a variable speed 8 by means of a belt 9. At the opposite end, through a belt 10, a worm gear 11 and a cardan 12, the friction wheel 13 is driven, which frictionally drives the trough 1.

To the delivery pipe of the fan 6 a frustoconical conveying channel 14 is connected, which has its own annular delivery port arranged beneath, and in correspondence with, the foraminous bottom plate 2 of the trough 1. Between the port of the conveying channel 14 and the bottom 2 of the trough, a fixed annular distributing disk 4 is removably affixed (to allow replacement) and this disk is also foraminous in order that an improved distribution of the blown air, which is to pass through the foraminous bottom plate of the rotatable trough 1, may be obtained.

Registering with one of the cells 15 (if the trough 1 is supposed to be at standstill), is the fixed hopper 17 for the receipt and loading of the granules, which opens at 17'; whereas, in registry with another cell, angularly spaced with respect to the former, in the direction of the rotation, by an angle approximately wider than 270 degrees, there is arranged the port 18, also fixed, of the outlet and discharge conduit 19 (see FIG. 3). The annular distributing disk 4 has thus an arcuate sector 20' (FIG. 4) which is entirely open to facilitate the flow of the air intended to expel the cooled (or, respectively, warmed) granules through the discharge port 18, and also an adjoining sector 20 having a partially or entirely closed bottom not to interfere with the arrival and the fall of the granules through the loading port 17' of the hopper 17.

Both the loading port 17' and the discharge port 18, as well as the relative conduits are formed in a lid 25, which is preferably frustoconical in shape and is fixedly arranged above the trough 1 and has the mere function of conveying air, which already has passed through the trough 1, towards the discharge port 22 and of causing to fall into the trough again those lighter airborne granules (scales) which could possibly be present. Said outlet port 22 can be protected by a mesh 23 but, more advantageously, instead of a mere mesh, a special filter can be mounted for filtering out from the outcoming airstream the dusts and scales which would otherwise pollute the premises.

FIGURE 3 illustrates a simple and efficient filter, which consists of a cylindrical or prismatical body 26 having its walls formed by a close-mesh wire net and by an internally mounted collecting cup 27 which has a diameter less than that of the body 26, said cup being borne by an axial stud 28 which can be set at an adjustable level by the set screw 29 passing through the wall of the guiding sleeve 30 rigid with the lid 31. In order to avoid the dispersion into the premises of the fine dust which could pass through the wire net 26, there is provided means for the possible mounting of a filtering bag 32 of fabric or paper which, while allowing air to pass through, locks the dust inside. This bag can be mounted in place by resilient rings 33, 34 clamping it to the lid 31 and the bottom sleeve 35 of the filter.

To ensure that the air coming out of the port 20' has the pressure which is necessary for effecting the pneumatical expulsion of the granules, it has proven to be suitable and sufficient to bypass that portion of the airflow which is needed, directly from the outlet port of the fan and to channel it towards the sector 20' via a conduit distinct from the remainder of the conduit 14, this latter being intended to carry the balance of the airflow from the fan to the distributing disk 4. The aforesaid distinct conduit for channelling air directly to the sector 20' may be easily obtained by arranging within said frustoconical conduit 14 two radially oriented partitions 36, 36' (FIG. 4) spaced apart by a distance equal to the width of the sector 20' and extending from the delivery port of the fan to the edges of the sector 20'.

During the operation, or before, and consistently with the nature and specific gravity of the material and of the amount of heat to be withdrawn (or supplied), it will be possible to adjust both the rotational speed of the trough and the rate of flow and pressure of the inblown air.

In the course of tests effected with an apparatus of the kind described and illustrated above, having a circular trough (O.D. 20", I.D. 10"), and driven at a rate of 2 revolutions per minute, with a centrifugal fan driven by a 500-watt motor, it has been possible to cool as much as 330 pounds an hour of rigid PVC granules with a temperature drop from 180° C. to 30° C.

What I claim is:

1. Apparatus of the character described comprising, in combination:

a rotatable annular conveying trough, open at the top, and having a foraminous bottom plate, two side walls, and a plurality of partition walls, said partition walls extending radially of the axis of rotation of said trough, and being secured to said bottom plate and said side walls to rotate therewith, said partition walls being disposed in planes radial of the axis of rotation of the trough and being perpendicular both to the side walls and the bottom plate and partitioning the trough into a plurality of equi-angularly spaced, open-topped cells, means for rotating said trough continuously at an adjustable speed about its axis to convey the granules which come into the trough from a fixed loading port to a fixed discharge port, said loading and discharge ports being spaced angularly from one another and both being disposed above said trough, means for blowing air through said foraminous bottom plate from beneath upwardly in a direction substantially perpendicular to the direction of travel of said trough and at a rate of flow and a pressure such as to maintain the granules within said individual compartments throughout their whole travel between loading and discharge ports, so as to impart a continuous shaking motion to said granules whose amplitude is proportional to the load and never exceeds the height of said trough, and to discharge said granules from said trough, when a compartment registers with said discharge port, by pneumatic expulsion by the air blown from beneath the trough.

2. An apparatus according to claim 1, wherein, between the foraminous bottom plate of the conveying trough and the annular discharge port of the collector which conveys air from the fan to the trough, an annular disk is interposed, said disk being removably affixed and fitted with perforations for an improved distribution of air, said disk having a sector which is wholly or partially closed in correspondence to the loading port not to disturb the granules entering said trough, and another sector completely open in the correspondence of the discharge port for eliminating any resistance to the flow of air intended to effect the pneumatical expulsion of the granules.

3. An apparatus according to claim 1 wherein a frusto-conical lid is secured on top of said trough, said lid has at its top an air outlet port to discharge from the apparatus the air which has already passed through said trough, a filter is applied to the outlet port of the lid, said filter consisting of a prismatic or cylindrical body having wire-net walls and a collecting cup, internally mounted thereon, and having a diameter less than that of said body, said cup being capable of being affixed at various levels along a settable central guiding stud.

4. An apparatus according to claim 1, wherein a distributing disk is disposed beneath said foraminous bottom plate, said disk is coextensive with said foraminous bottom plate, and bears at least two open sectors therein, a collector is provided which blows air from the fan to the trough and which is partitioned by two radial partitions into two compartments, one having a lesser area and intended directly to convey a portion of the airflow from the fan to the open sector of the distributing disk for expelling the granules, the other one of larger area to convey the remainder of the airflow beneath the foraminous disk.

References Cited by the Examiner

UNITED STATES PATENTS

| | | | |
|---|---|---|---|
| 607,209 | 7/1898 | Beck | 34—197 X |
| 790,162 | 5/1905 | Trump | 34—57 X |
| 1,675,099 | 6/1928 | Gregg et al. | 34—187 X |
| 2,256,017 | 9/1941 | Curran | 34—187 X |
| 2,338,807 | 1/1944 | Emery | 55—463 X |
| 2,904,847 | 9/1959 | Burns | 34—57 X |
| 3,133,797 | 5/1964 | Pierson | 34—217 X |
| 3,214,844 | 11/1965 | Oates et al. | 34—57 |

FOREIGN PATENTS

| | | |
|---|---|---|
| 266,217 | 10/1913 | Germany. |
| 236,079 | 7/1925 | Great Britain. |

FREDERICK L. MATTESON, JR., *Primary Examiner.*

A. D. HERRMANN, *Assistant Examiner.*